United States Patent Office.

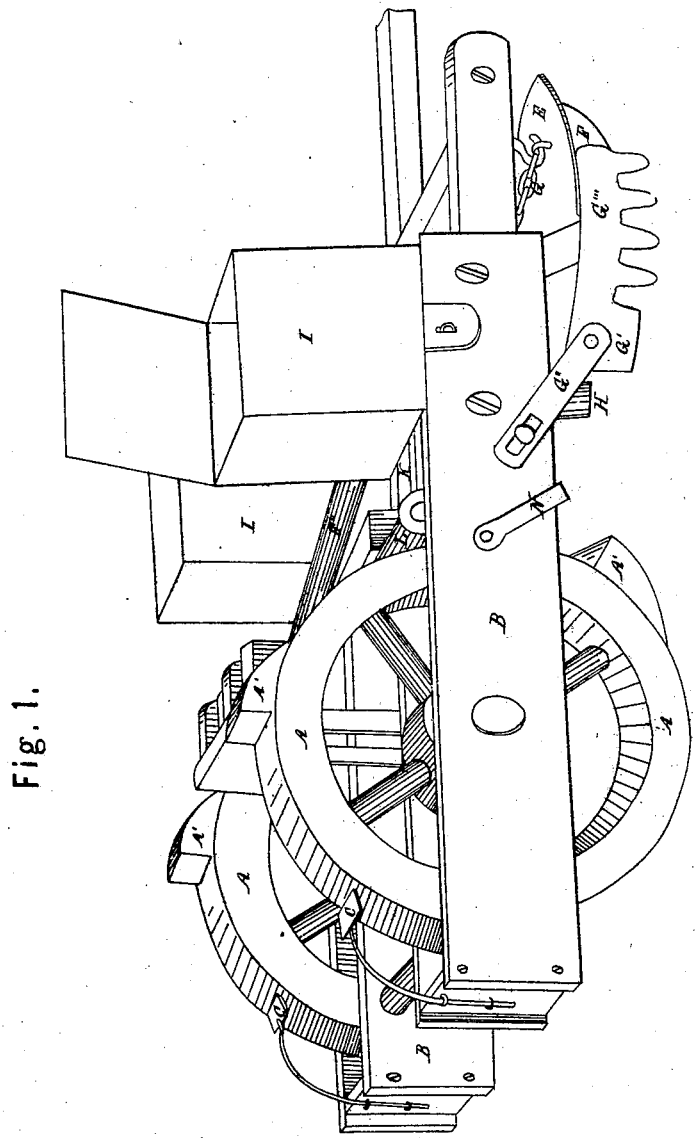

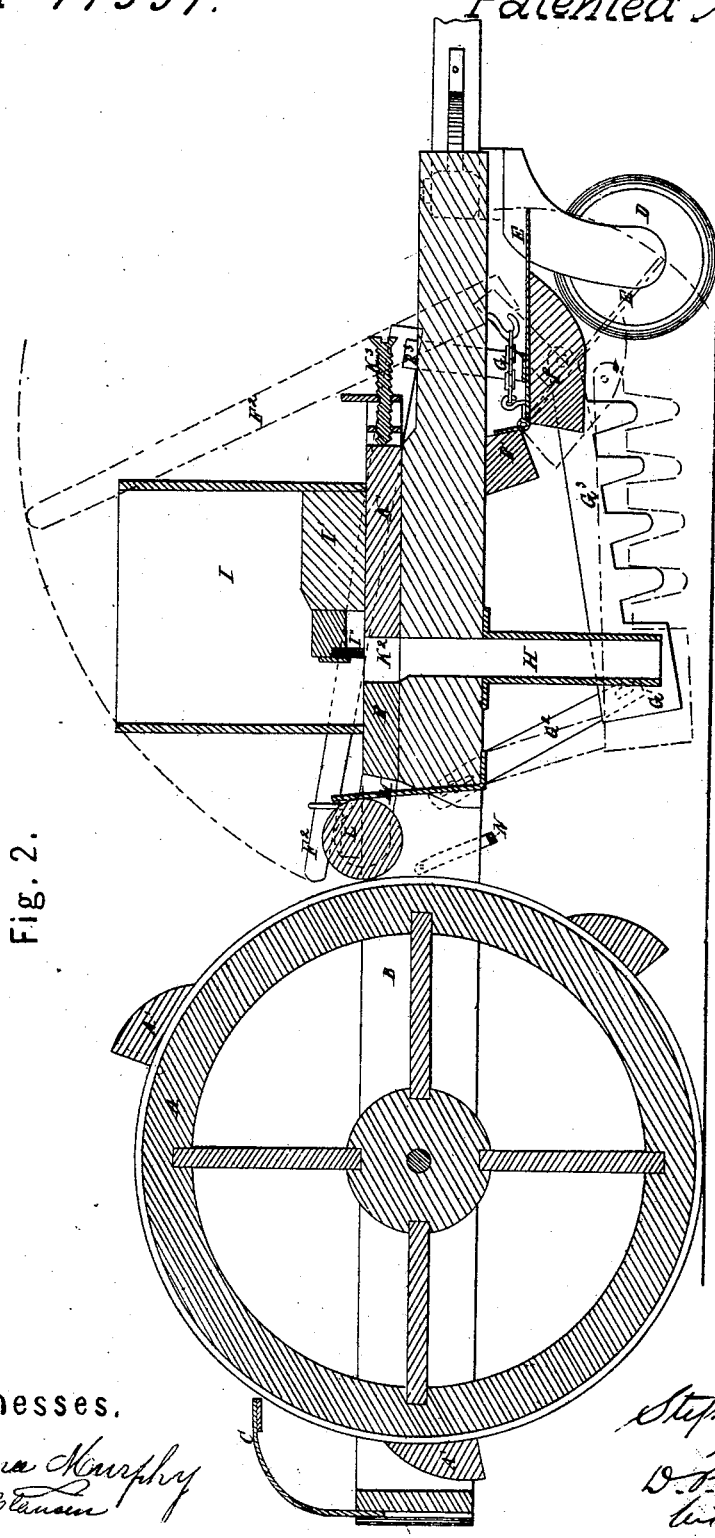

STEPHEN B. WARD, OF AUBURN, INDIANA.

Letters Patent No. 71,557, dated November 26, 1867.

---

IMPROVEMENT IN SEEDING-MACHINES.

---

*The Schedule referred to in these Letters Patent and making part of the same.*

---

TO ALL WHOM IT MAY CONCERN:

Be it known that I, STEPHEN B. WARD, of Auburn, in the county of De Kalb, and State of Indiana, have invented a new and useful Improvement in Seed-Planters; and I do hereby declare that the following is a full, clear, and exact description of the same, reference being had to the annexed drawings, making part of this specification, in which—

Figure 1 is a perspective view, and
Figure 2 is a vertical longitudinal section.

The same letters in both figures, when employed, indicate the same parts.

The following description will enable persons skilled in the art to construct my improved seed-planter, and the nature and extent of my improvement will appear from the following specifications and claims.

A A are wheels, running in the main frame B, on which are fastened spurs A', projecting from the periphery of the wheels at a distance measured on the circumference of the wheel equal to the intended space between the hills. These spurs are shaped as represented, being rounded on the side towards which they revolve to form a curved inclined surface, for purposes to be explained. Scrapers C are attached to the frame by springs, which, pressing them against the face of the wheel to clear off the adhering earth, permit them to yield to the spurs as they pass in succession. The front end of the frame rests upon a caster-wheel, D, which is attached to the tongue, and serves as a guide-wheel. On the front end of the side pieces of the main frame are shovel-ploughs E, used for the purpose of furrowing out. These shovels are attached to standards F, which are fastened to the beams F', by hinges, permitting the standards to be folded forward when the ploughs are not in use, and thus raised above the ground. This movement is effected by means of the lever F'', attached to the cross-brace F''', which connects the two standards. Chains G, extending from the frame to the standard, support the strain upon the ploughs so as to relieve the hinges. Harrows G''' are attached to the hinged standards, on each side thereof, to break up the earth on each side of the seed-row, and behind these flanges G' are turned inwards, and so arranged as to throw the earth over the seed when dropped by the planting-mechanism. The rear ends of the harrow-frames are sustained by straps G'', which are adjustably attached to the outer and inner sides of the side pieces of the main frame in such manner as to permit the harrow and covering-flanges to be raised by the same action which elevates the ploughs.

The seeding-mechanism is as follows: H are the seed-tubes, through which the grain is deposited. I I are the seed-boxes, and K the seeding-slides, which receive a reciprocating motion which carries the opening $K^1$ alternately into the space in the seed-box filled with grain, which falls into said opening, and then the slide is moved over the seed-tubes H, the cover $I^1$ preventing the grain from passing directly from the hopper into the tube. $I^2$ is a brush placed over the slide to brush back the seed from the slide as it passes under the cover $I^1$. The middle part of the slide K is made separate, the part $K^2$ sliding between the slides to increase or diminish the size of the orifice $K''$. This motion is regulated by the set-screw $K^3$. The reciprocating motion of the slides K is derived from the revolution of the wheels A. A friction-roller, L, is attached to the rear end of each slide. The spring M pressing the slide back, retains it in contact with the periphery of the wheel until the spurs A strike the roller and force the slide forward, dropping the seed into the tube H'. As soon as the spur has passed the roller L, the spring M draws back the slide. Stirrups N are placed across the frame in front of the wheels, which will catch the square end of the spur and prevent their being turned back against the roller L.

As the seeds are deposited at perfectly regular intervals, the operation of planting corn in squares may be performed without furrowing out, by starting the planting on the return rows, at the line of the rows already planted. The spurs A' mark in succession the spot where the hill has been deposited.

What I claim as my invention, and desire to secure by Letters Patent, is—

1. The combination of the seed-slide K with roller L and the wheel A, the latter being constructed with spurs to perform the double function of actuating the seeding-mechanism and marking hills, substantially as set forth.

2. The combination of the wheel A with spurs A' and scrapers C, arranged as set forth.

3. The combination of the seeding-mechanism and the adjustable ploughs, harrows, and covering-flanges, substantially as set forth.

4. The combination and arrangement of the harrows G''', straps G'', and hinged standards F, and lever F'', arranged to operate substantially as set forth In testimony whereof, I have signed my name to this specification in the presence of two subscribing witnesses.

STEPHEN B. WARD.

Witnesses:
W. GRISWOLD,
JOHN L. DAVIS.